United States Patent [19]

Park et al.

[11] Patent Number: 4,579,701

[45] Date of Patent: Apr. 1, 1986

[54] METHOD FOR OBTAINING LOW DENSITIES WITH PARTICULATE EXPANDABLE POLYSTYRENE

[75] Inventors: Chung P. Park, Pickerington; James T. Grimes, Newark, both of Ohio

[73] Assignee: The Dow Chemical Company, Midland, Mich.

[21] Appl. No.: 653,396

[22] Filed: Sep. 24, 1984

[51] Int. Cl.[4] .......................... B29C 67/22; C08J 9/22
[52] U.S. Cl. ................. 264/53; 264/DIG. 9; 264/DIG. 15; 425/4 R
[58] Field of Search ............... 264/53, 51, 54, DIG. 9, 264/DIG. 15; 425/4 R

[56] References Cited

U.S. PATENT DOCUMENTS

| | | | |
|---|---|---|---|
| 2,795,008 | 6/1957 | Lindemann et al. | 264/54 |
| 3,050,513 | 8/1962 | Zelinski et al. | 526/159 X |
| 3,060,513 | 10/1962 | Klink et al. | 264/26 |
| 3,251,728 | 5/1966 | Humbert | 264/53 |
| 3,347,961 | 10/1967 | Russell | 264/53 |
| 3,598,769 | 8/1971 | Hanton | 264/51 X |
| 3,631,133 | 12/1971 | Battigelli | 264/53 X |
| 3,639,551 | 2/1972 | Leach | 264/53 X |
| 3,738,020 | 6/1973 | Hanton | 264/51 X |
| 3,829,269 | 8/1974 | Smith | 264/52 X |
| 3,855,053 | 12/1974 | Fuss | 264/51 X |
| 3,933,959 | 1/1976 | Skochdopole et al. | 264/45.5 |
| 4,073,842 | 2/1978 | Smith | 264/53 |
| 4,284,372 | 8/1981 | Smith | 406/106 |

Primary Examiner—Philip Anderson
Attorney, Agent, or Firm—R. B. Ingraham; M. L. Winkelman

[57] ABSTRACT

Low density expanded polystyrene is obtained by extended exposure of particles to atmospheric steam and aging the particles in air. Particles have wrinkled cell walls.

8 Claims, 1 Drawing Figure

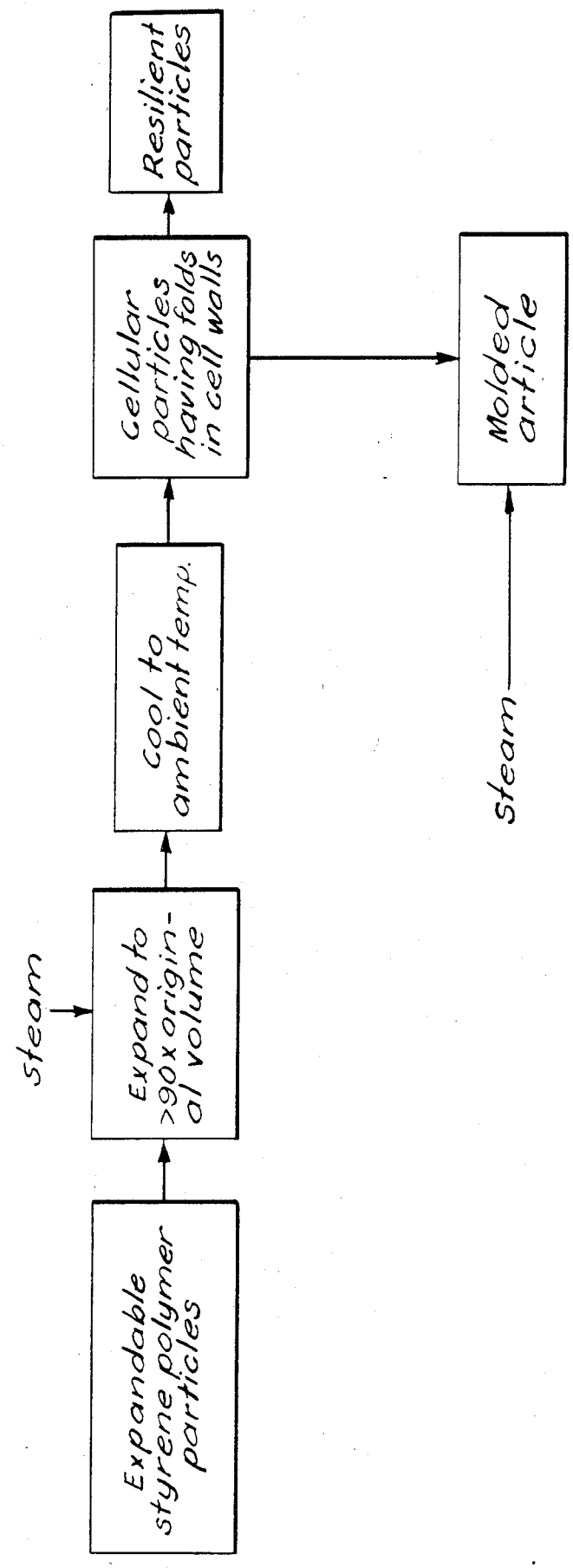

METHOD FOR OBTAINING LOW DENSITIES WITH PARTICULATE EXPANDABLE POLYSTYRENE

Particulate expandable polystyrene has found a wide variety of applications in commerce. Such expandable particulate polystyrene has been employed with great benefit in the preparation of extruded foam sheet employed for a wide variety of packaging applications. Oftentimes such foam sheet is thermoformed into such articles as meat trays, containers for various fast food services and like applications. Expandable polystyrene particles have also been employed for the preparation of a wide variety of foam articles including thermally insulated hampers suitable for food use and similar applications, such as foam cups which are desirable for either hot or cold beverages. Expandable styrene polymer particles are also molded into foamed dunnage shapes suitable for the protection during transportation of delicate instruments and other shock sensitive articles. Another common application of such expandable polymer particles is in the formation of loose fill dunnage materials. A plurality of expandable styrene polymer particles are prepared having a predetermined shape, which are subsequently foamed or expanded to provide a loose fill dunnage material which in most instances is of a geometric configuration such that under relatively light pressure, the particles tend to interlock and to prevent movement of an article being shipped therein. In most commercial situations in the field of molding and loose fill dunnage utilizing expandable styrene polymer particles, substantial effort has been expended in order to obtain maximum functionality employing a minimal quantity of the expandable particles. Thus for many applications the production of foamed styrene polymer particles having minimal density and maximum functionality is a desirable and worthwhile goal. A variety of foaming techniques have been set forth for the preparation of such expanded particles, some of which are set forth in the following U.S. Pat. Nos. 3,050,513; 3,347,961; 3,598,769; 3,631,133; 3,639,551; 3,738,020 and 3,855,053, the teachings of which are herewith incorporated by reference thereto.

In many instances, employing a freshly prepared expandable styrene polymer particle, exposure to hot air, heated liquid, or steam at about atmospheric pressure results in an expanded particle having roughly from 40 to 60 times the initial volume of the unexpanded particle. The freshly expanded particle is generally soft and resilient, relatively flexible and provides an excellent cushioning material usually for only a relatively short period of time. As the particle is exposed to atmospheric conditions for varying periods of time, the property of resilience decreases and eventually the particle becomes relatively rigid and brittle. Such a phenomenon is generally attributed to loss of plasticizing blowing agent. In many instances, the permeability of air through the cell walls of an expanded styrene resinous particle is more rapid than the rate of diffusion of the blowing agent through the walls of the particle. Therefore the particle becomes brittle as more and more blowing agent is lost to the surrounding atmosphere and is replaced by air. In many applications such a rigid particle is considered highly desirable in that it provides, particularly when employed as a loose fill dunnage material, a desired resistance to the movement of an article which is packaged within a container; and the expanded particles are employed as loose fill dunnage material to maintain the article in a desired position. However, such rigidity in particles becomes much less desirable when shock resistant dunnage is desired; for example in the packaging of delicate electronic instruments, glass articles and the like. In the packaging of shock sensitive articles, a relatively flexible material is desired which minimizes the impact shock on the article being packaged and also prevents movement of the packaged article relative to the container in which it is packed. By movement, not the instantaneous movement at the moment of shock but the tendency of the article to be repositioned relative to the walls of the container, when the container and contents are at rest after being subjected to appropriate shock conditions applied to the container. Relatively resilient and flexible expanded styrene polymer particles have been obtained in the past by a technique frequently referred to as "super expansion". Expansion of expandable styrene particles is generally achieved by heating the particles to a temperature above their glass transition temperature wherein a foaming agent usually a volatile fluid foaming agent, such as pentane or a chlorofluorocarbon or fluorocarbon, employed as the volatile fluid foaming agent. The particles upon being heated to a foaming temperature expand, and are subjected to a subatmospheric pressure which causes further expansion of the particles. Such particles, if exposed to further atmospheric pressure, tend to expand to relatively low densities. Upon return of such particles to atmospheric pressure, frequently substantial shrinkage is observed. Generally when the shrinkage is observed, this is a result of partial collapse of the cellular structure of the expanded styrene polymer. Usually such shrinkage or partial collapse of the foamed particle results in the formation of a plurality of folds occurring in the cell walls and struts of the expanded styrene polymer. Such folds are referred to as "accordion folds". At least on a short term basis, such folds resemble somewhat the folds occurring in the bellows of an accordion. The particles while not necessarily exhibiting extremely low densities which are oftentimes desired, do exhibit a resiliency not encountered in particles which have been expanded for a period of time by conventional methods at atmospheric pressure. Most commercially useful processes for the preparation of expandable styrene polymer particles employ foaming processes which require only about atmospheric pressure. For many applications the use of vessels which would contain super atmospheric pressure or which could sustain subatmospheric pressure are prohibitively expensive. In order to obtain expanded styrene polymer particles of desired low density, oftentimes so-called cycle foaming or multi-stage foaming process is employed. Such a cycle foaming process or multiple expansion process generally involves the initial exposure of expandable styrene polymer particles to a heating medium, such as steam or hot air at atmospheric pressure for a sufficient period of time for the particles to expand about 30 to 40 times their original volume. The heating medium is generally removed after a period of usually less than 5 minutes and the particles permitted to stand at ambient temperature and pressure for a period of time, for example, about 24 hours. The particles are again subjected to expanding conditions, generally steam or hot air at atmospheric pressure, and a secondary expansion occurs. Such a process may be repeated as often as necessary in the hope of obtaining particles of a desired low density. Initial expansion of the particles is believed to be due to the presence of a volatile fluid foaming agent within the particles which becomes gaseous on heating and stretches the heat plastified styrene polymer as cells form and the particles expand. On cooling to room temperature, air will tend to diffuse into the particles at a rate greater than the volatile fluid foaming agent diffuses out of the particles, and on subsequent heating, air which has diffused through the cell walls into the particle provides a secondary blowing agent. For many applications, such a cycle or sequential foaming process requires excessive time, relatively large volumes of equipment to store, age and subsequently expand and re-expand the expandable particles.

The following U.S. patents relate to foaming of particles and to loose fill dunnage material: Nos. 3,060,513; 3,251,728; 3,347,961; 3,598,769; 3,631,133; 3,639,551; 3,738,020; 3,829,269; 3,855,053; 3,933,959; 4,073,842; and 4,284,372, the teachings of which are herewith incorporated by reference thereto.

It would be desirable if there were available an improved method for the preparation of low density expandable styrene polymer foams.

It would also be desirable if there were available an improved method for the preparation of low density resilient expandable synthetic resinous foams employing only a single expansion step.

It would also be desirable if there were available an improved method for the preparation of expandable styrene polymer foams of low density wherein the foams were flexible and resilient.

These benefits and other advantages in accordance with the present invention are achieved in a method for the expansion of expandable styrene polymer particles, the steps of the method comprising exposing expandable synthetic resinous styrene polymer particles containing a volatile fluid foaming agent to atmospheric steam to thereby heat the particles, cause volatilization of the volatile organic blowing agent and to form a plurality of gas filled cells within the expandable styrene polymer particle the improvement which comprises continuously exposing the particles to the steam atmosphere until the particles have expanded to a volume in excess of 90 times the volume of the initial unfoamed expandable styrene polymer particle and subsequently cooling the expanded particles to ambient temperature to thereby provide a plurality of expanded cellular styrene polymer particles, each of the particles having a plurality of cells, the cells having walls, the walls having a plurality of folds therein, the resultant particles being generally of a resilient nature. The drawing illustrates a flow diagram of the claimed process.

Expandable polymer particles useful in the practice of the present invention, generally are particles of a particle size of from about 0.25 millimeters to about 8 millimeters, containing therein a volatile fluid foaming agent having a boiling point below the glass temperature of the styrene polymer particle. Volatile fluid foaming agent is generally incorporated within the expandable styrene polymer particle in a quantity sufficient that on heating in atmospheric steam or heating in steam at atmospheric pressure, the particle will show a 30 to 40 fold increase in volume when the exposure to steam is for a period of up to 5 minutes. A wide variety of volatile fluid foaming agents may be employed in the preparation of expandable particles useful in the practice of the method of the present invention. Such volatile fluid foaming agents include by way of example and not by limitation such materials as pentane, hexane, butane, chlorodifluoromethane, dichlorodifluoromethane, difluoroethane, methylchloride and various mixtures thereof. Such volatile fluid blowing agents inherently have a diffusion rate through the styrene polymer which is substantially less than the diffusion rate of air through such a polymer.

The method of the present invention is readily practiced with any expandable styrene polymer particles which will expand to 30 to 40 times their initial volume on exposure to atmospheric steam for a period of up to about 5 minutes. To obtain resilient expanded styrene polymer particles in accordance with the method of the present invention, it is essential that such particles be exposed to steam at atmospheric pressure for a period of from about 30 to 120 minutes in order to achieve the desired ninety-fold increase in volume of the particles. Expanded particles in accordance with the method of the present invention may be obtained by exposing unagitated or agitated particles to steam for the necessary period of time. In the event that substantial volume of expanded particles are required, it is frequently desired to provide agitation such as by tumbling in a foraminous drum in order to provide uniform exposure of the particles to the atmospheric steam. The desired volume increase has been obtained by exposure to atmospheric steam, the expanded particles beneficially are cooled to ambient temperature whereupon some shrinkage of the particle is observed, thereby forming wrinkles or folds in the cell walls and lending a substantial degree of resilience to the particles. Generally particles in accordance with the present invention exhibit a bulk density of between about 0.2 and 0.6 pounds per cubic foot. Oftentimes, depending upon the end use desired for particles expanded in accordance with the method of the present invention, it is desirable to remove moisture therefrom. This is readily accomplished by exposing particles to air having a relative humidity less than about 75 percent. Beneficially, if a large quantity of such particles are to be dried, a fluid bed is eminently satisfactory therefor. Low density resilient particles prepared in accordance with the present invention are eminently suited for use as free flow dunnage material particularly for delicate articles, such as instruments, glass fabricated articles and the like. Particles prepared in accordance with the method of the present invention are also useful in the preparation of moldings by confining a plurality of particles expanded in accordance with the method of the present invention within a mold, heating the particles to a temperature sufficient to cause fusion of the adjacent particles to each other. The resultant molded article sometimes exhibits some shrinkage. Shrinkage oftentimes may be counteracted by pressurizing the molded article in air, beneficially at temperatures of 40° centigrade to about 80° centigrade. Pressures ranging from about 5 pounds per square inch to about 30 pounds per square inch gauge and subsequently returning the molded article to ambient conditions whereupon the original molded form is usually regained.

The invention is further illustrated but not limited by the following examples:

EXAMPLE 1

A plurality of expandable polystyrene granules having a generally S-shaped cross sectional configuration were prepared by extrusion using a 1-¼ inch extruder, the polystyrene polymer was a polystyrene resin having a weight average molecular weight of about 200,000 grams per mole. Volatile fluid foaming agent was employed using a 4:1 by weight mixture of trichlorofluoromethane and pentane. The volatile fluid foaming agent was employed at a concentration of about 12 parts per hundred by weight of blowing agent per hundred parts of the polymer. The polymer containing the volatile fluid foaming agent was extruded as a strand having a generally S-shaped cross sectional configuration. The strand was severed into granules having a generally S-shaped configuration. The resultant expandable polystyrene was annealed in water at a temperature of about 65° centigrade for a period of 30 minutes, dried and aged at ambient temperature for about 24 hours. The granular material was then exposed to steam at atmospheric pressure for varying periods of time. The weight and volume of several of the particles were determined as an aggregate and the resulting weight and volume of particles determined after various periods of exposure to atmospheric steam, aging at atmospheric pressure, portions of the particle were pressurized after aging by means of air at a temperature of 40° centigrade, at 27 pounds per square inch gauge for a period of 22 hours. After air pressurization, the particles were aged at ambient temperature in air for a period of at least 24 hours.

The results of the experiments are set forth in Table I.

TABLE I

| Expansion Time (min) (1) | Expansion Ratio | | | | |
|---|---|---|---|---|---|
| | Immediately after expansion (2) | After aging (3) | After air pressurization (4) | Prior to vacuum test (5) | In vacuum (6) |
| *1 | 12 | 12 | ND | ND | ND |
| *3 | 26 | 25 | ND | ND | ND |
| *5 | 27 | 29 | ND | ND | ND |
| *10 | 39 | 39 | ND | ND | ND |
| *20 | 30 | 29 | 29 | 56 | 95 |
| 30 | 22 | 63 | 83 | 89 | 129 |
| 60 | 34 | 59 | 77 | 109 | 157 |
| 120 | 29 | 57 | 65 | 90 | 175 |
| 240 | 27 | 53 | 71 | 51 | 101 |

Note:
* = Not an example of this invention
ND = Not determined

Under the heading of (2) is shown the expansion ratio of the foam body determined within about 10 minutes after being removed from steam atmosphere at atmospheric pressure, the expansion ratio being the volume of the foamed particle divided by the volume of the unfoamed particle. Under the column headed (3) is indicated the expansion ratio of the foam body determined after about 2 days after removing from the atmospheric steam. (4) indicates the ratio of the foam body after pressurizing in air for 22 hours under a pressure of 22 pounds per square inch gauge. (5) indicates the expansion ratio of the foam body at atmospheric pressure whose volume was determined in vacuum; and (6) indicates the expansion ratio of the foam body determined in vacuum after being fully aged. The particles which were expanded beyond about 5 minutes and less than about 30 minutes, shrank immediately after being removed from the steam atmosphere. Those expanded for 30 minutes or longer also shrank, but their original volume was recovered after aging at ambient temperature in air. Particles exposed to steam for a period shorter than 30 minutes did not expand on subsequent treatment. Those particles which recovered original expanded volume reached a steady state final volume after a period of about 2 days. In the vacuum treatment of the particles set forth in Table I, a vacuum of about 9 millimeters of mercury was applied. The volume of the foamed particles was determined by displacement of a silicone oil. The beads can be aged at 125 degrees Fahrenheit in an air oven to accelerate recovery.

Particles prepared with steam exposure times of 30 minutes and greater were found eminently satisfactory for use as loose fill dunnage material. The particles were resilient rather than stiff and relatively brittle as were the particles obtained employing steam expansion times of less than about 30 minutes.

EXAMPLE II

The procedure of Example 1 was repeated with the exception that the styrene polymer was a 60:40 mixture by weight of a polystyrene having a weight average molecular weight of 285,000 grams per mole and a polystyrene having a weight average molecular weight of about 200,000 grams per mole. The results are set forth in Table II wherein the column headings have the same meaning as those utilized in Example 1. The expandable polystyrene material prepared in this example exhibits a very desirable uniformity in expansion characteristics of the individual particles. Most particles are re-expanded to a desirable low density. Particles which were exposed to the steam for a period of 1 hour or longer during ambient aging at ambient temperature and air pressure re-expanded to densities equivalent to those generally obtained with sequential foaming of commercially available expandable polystyrene particles of similar shape employed for loose fill dunnage applications which are expanded by 3 sequential heating, cooling and aging processes. Particles in accordance with the present invention provided a relatively smooth surface without the evidence of cracks and splits which were present in the commercial material which had been expanded by a 3-step process. Flexibility and resilience of the material prepared in accordance with the present invention was also significantly better than that exhibited by commercial material expanded by a 3-step process.

A plurality of cubes approximately one-quarter inch on the edge were cut from aged particles which had been exposed to atmospheric steam for a period of about 1 hour. The foamed cubes were then placed in a cylindrical mold which had an inside diameter of about 1-⅜ inch and was about 2 inches in length. The mold had walls which were perforated. Steam under atmospheric pressure was introduced into the mold for a period of about 20 seconds. Mold and contents were subsequently cooled and a molded article remove from the mold. The molded article had flexibility and resiliency which was much greater than that of molded articles prepared employing conventional molding processes. The molded part did exhibit some shrinkage upon cooling. The results of exposure of the particles to atmospheric steam are set forth in Table II.

TABLE II

| Expansion Time (min) (1) | Expansion Ratio | | | | |
|---|---|---|---|---|---|
| | Immediately after expansion (2) | After aging (3) | After air pressurization (4) | Prior to vacuum test (5) | In vacuum (6) |
| *1 | 20 | 18 | ND | ND | ND |
| *3 | 38 | 41 | ND | ND | ND |
| *5 | 38 | 39 | ND | ND | ND |

TABLE II-continued

| Expansion Time (min) (1) | Expansion Ratio | | | | |
| --- | --- | --- | --- | --- | --- |
| | Immediately after expansion (2) | After aging (3) | After air pressurization (4) | Prior to vacuum test (5) | In vacuum (6) |
| *10 | 28 | 32 | 49 | 34 | 56 |
| *20 | 24 | 50 | 70 | 54 | 82 |
| *20 | 18 | 26 | 35 | ND | ND |
| *30 | 30 | 37 | 56 | 39 | 61 |
| *30 | 19 | 46 | 79 | ND | ND |
| 45 | 29 | 74 | 102 | 80 | 120 |
| 60 | 28 | 90 | 115 | 95 | 150 |
| 120 | 29 | 111 | 137 | 114 | 175 |
| 240 | 24 | 119 | 133 | 120 | 199 |

Note:
* = Not an example of this invention
ND = Not determined
(1) through (6) = the same as in Table I.

EXAMPLE III

The procedure of Example I was repeated with the exception that a polystyrene resin having a molecular weight of about 150,000 grams per mole was employed. The results are set forth in Table III.

TABLE III

| Expansion Time (min) (1) | Expansion Rates | | |
| --- | --- | --- | --- |
| | Immediately after expansion (2) | After aging (3) | After air pressurization (4) |
| *1 | 29 | 29 | ND |
| *3 | 30 | 34 | ND |
| *5 | 28 | 29 | ND |
| *10 | 31 | 30 | 33 |
| *20 | 28 | 40 | 50 |
| 30 | 49 | 61 | 96 |
| 60 | 38 | 79 | 106 |
| *120 | 18 | 24 | 28 |

Notes:
* = Not an example of this invention
ND = Not determined
(1) through (4) = same as in Table I.

In a manner similar to the foregoing illustrations, a wide variety of expandable styrene polymer particles are readily prepared employing a single exposure to steam at atmospheric pressure. These particles are eminently satisfactory as loose fill dunnage or for the molding of shaped articles having enhanced flexibility and resiliency.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a method for the expansion of expandable styrene polymer particles the steps of the method comprising exposing expandable synthetic resinous styrene polymer particles containing a volatile fluid foaming agent to atmospheric steam to thereby heat the particles, cause volatilization of the volatile organic blowing agent and to form a plurality of gas filled cells within the expandable styrene polymer particle the improvement which comprises continuously exposing the particles to the steam atmosphere until the particles have expanded to a volume in excess of 90 times the volume of the initial unfoamed expandable styrene polymer particle and subsequently cooling the expanded particles to ambient temperature to thereby provide a plurality of expanded cellular styrene polymer particles, each of the particles having a plurality of cells, the cells having walls, the walls having a plurality of folds therein, the resultant particles being generally of a resilient nature.

2. The method of claim 1 wherein the polymer is polystyrene.

3. The method of claim 1 wherein particles have reached a diameter of from about 0.25 to about 8 millimeters.

4. The method of claim 1 wherein the volatile fluid foaming agent has a diffusion rate through the polymer of less than the diffusion rate of air.

5. The method of claim 1 wherein particles are exposed to a steam atmosphere for a period of about 120 minutes.

6. The method of claim 1 wherein the resultant particles have a density of from about 0.2 to about 0.6 pounds per cubic foot.

7. The method of claim 1 wherein the particles have a generally S-shaped configuration.

8. The method of claim 1 including the additional steps of introducing the particles into a mold; coalescing and molding the particles into a unitary body by exposure to steam.

* * * * *